(12) United States Patent
Senter, Jr.

(10) Patent No.: US 9,206,935 B2
(45) Date of Patent: Dec. 8, 2015

(54) QUICK ACTING PIPE CLAMP

(71) Applicant: Miller Marine, Inc., San Diego, CA (US)

(72) Inventor: Edward W. Senter, Jr., San Diego, CA (US)

(73) Assignee: Miller Marine, Inc., San Diego, CA (US)

( * ) Notice: Subject to any disclaimer, the term of this patent is extended or adjusted under 35 U.S.C. 154(b) by 0 days.

(21) Appl. No.: 14/304,849

(22) Filed: Jun. 13, 2014

(65) Prior Publication Data

US 2015/0219267 A1 Aug. 6, 2015

Related U.S. Application Data

(60) Provisional application No. 61/934,378, filed on Jan. 31, 2014.

(51) Int. Cl.
*F16L 55/16* (2006.01)
*F16L 55/17* (2006.01)

(52) U.S. Cl.
CPC .................. *F16L 55/1715* (2013.01)

(58) Field of Classification Search
CPC . F16L 55/1715; F16L 55/172; Y10T 24/1441
USPC .......................................... 138/99, 97; 24/279
See application file for complete search history.

(56) References Cited

U.S. PATENT DOCUMENTS

| | | | | |
|---|---|---|---|---|
| 1,290,041 | A * | 1/1919 | Anderson | 138/99 |
| 2,900,698 | A * | 8/1959 | Zartler | 24/279 |
| 4,381,020 | A * | 4/1983 | Daghe et al. | 138/99 |
| 4,630,647 | A * | 12/1986 | Thomson | 138/99 |
| 8,439,408 | B2 * | 5/2013 | Glocer et al. | 285/420 |

* cited by examiner

*Primary Examiner* — Patrick F Brinson
(74) *Attorney, Agent, or Firm* — Fish & Richardson P.C.

(57) ABSTRACT

A quick acting, adjustable pipe repair apparatus, comprises, a first shell portion having an inner and outer surface, a second shell portion having an inner and outer surface, a hinge connecting the first shell portion and the second shell portion, and two or more adjustable latch assemblies on the outer surface of the first and second shell portions. A gasket may be included covering substantially the entire inner surface of the first and second shell portions.

15 Claims, 6 Drawing Sheets

QUICK ACTING PIPE CLAMP

CROSS-REFERENCE TO RELATED APPLICATION

This application claims the benefit under 35 U.S.C. §119 (e)(1) of U.S. Provisional Application No. 61/934,378, filed on Jan. 31, 2014, which is incorporated by reference herein.

TECHNICAL FIELD

This disclosure relates to pipe repair, and more particularly to pipe repair in the marine environment or other industrial settings requiring damage control of operating machinery.

BACKGROUND

Marine damage control is required on merchant and naval vessels throughout the world. Damage control often includes patching or temporarily repairing damaged or ruptured pipes on operating machinery or systems. In the marine environment this can be critical to maintain the survivability and safe navigation of the vessel. The ability to put damaged pipes back into operation is even more critical in naval vessels that are required to maintain operations in all levels of combat and emergency conditions. Similar pipe repair requirements may be needed in other industrial setting where rapid or temporary repair of damaged piping is necessary to maintain safe operations of the industrial facility.

SUMMARY

The jubilee pipe patch is a well-tested fitting to patch a ruptured pipe. The jubilee pipe patch typically requires bolting two halves of a pipe over the damaged pipe. In a damage control situation, where fire, flooding and other environmental hazards make the manipulation of bulky pipe pieces, bolts and nuts, and tools difficult, a quick-acting and reliable pipe patch would meet most damage control needs.

Example implementations of the present apparatus are directed to a quick action pipe fitting such as a quick-action, adjustable jubilee pipe patch suitable for shipboard damage control.

In one example implementation, a pipe repair apparatus comprises: a first shell portion having an inner and outer surface; a second shell portion having an inner and outer surface; a hinge connecting the first shell portion and the second shell portion; and two or more adjustable latch assemblies on the outer surface of the first and second shell portions. The pipe repair apparatus may further comprise a circumferential gasket in contact with the inner surface of the first shell portion and the second shell portion. The gasket may be adhered or bonded to the inner surface of the first and second shell portions.

In a further example implementation, the pipe repair apparatus may further comprise a first shell portion having a cylinder half with a first longitudinal edge and a second longitudinal edge opposite the first longitudinal edge; and second shell portion having a cylinder half with a first longitudinal edge and a second longitudinal edge opposite the first longitudinal edge. The apparatus may further comprise a hinge connecting the first longitudinal edges of the first and second shell portions. And two or more adjustable latch assemblies transverse the second longitudinal edges of the first and second shell portions. The adjustable latch assemblies may be quick action closure members.

In still a further implementation, the pipe repair apparatus may further comprise a gasket having a first longitudinal edge and a second longitudinal edge, the gasket adhered to the first and second shell portions such that the first longitudinal edge of the gasket is aligned with and proximal to the second longitudinal edge of the first shell portion and the second longitudinal edge of the gasket is aligned with and proximal to the second longitudinal edge of the second shell portion. The gasket may be a substantially flat, planar and pliable material that is approximately the same area as the inner surface of the combined first and second shell portions. The gasket may have an area that is approximately 1% to 25% less than the combined inner surface of the first and second shell portions. The gasket may have an area that is approximately 1% to 25% greater than the combined inner surface of the first and second shell portions. The gasket may cover substantially the entire inner surface of the first shell portion, the entire inner surface of the second shell portion, or the entire inner surface of the first and second shell portions. The gasket may be adhered or bonded to the inner surface of the first shell portion, the inner surface of the second shell portion, or the inner surface of the first and second shell portions. The gasket may comprise rubber, silicon, rubber silicon, latex, microfiber material, or metal foil. The gasket may comprise ⅛ inch to 1 inch thick type ZZ-R-765 TY1A CL40 material.

In yet another example implementation, the pipe repair assembly further comprises two or more adjustable latch assemblies, each assembly having: a fulcrum attached to the outer surface of the first shell portion; a latch arm pivotally connected to the fulcrum; a threaded pull connected to the latch arm and comprising a cross rod and an adjustment nut; and a catch attached to the outer surface of the second shell portion and arranged to engage the cross rod of the threaded pull. The latch assemblies may further include two latch arms and a cross bar connecting the two latch arms. The latch assemblies may be configured to be a quick latch mechanism to easily secure the first and second shell portions about a damaged portion of the pipe and connected such that a longitudinal edge of the first shell portion and a longitudinal edge of the second shell portion are substantially aligned and in contact or near contact with each other. The latch assemblies may include a quick latch configuration having a threaded pull arm and an adjustment nut to adjust the tightness of the latch assembly.

Various embodiments and implementations may include one or more of the following features. The first and second shell portions comprise stainless steel, chromium-nickel steel alloys, brass, composite carbon reinforced pipe, plastic, or PVC. The shell portions may comprise 1/16 inch to 1 inch thick 316 Stainless Steel. The first and second shell portions when joined have an internal diameter of between 1 inch and 10 inches, including without limitation, 2.357 inch, 4.5 inch, 6.625 inch, and 8.485 inch. The first and second shell portions have a wall thickness of between 1/16 inch and 2 inch. The pipe repair apparatus may include two or more quick latch assemblies, three or more quick latch assemblies, four or more quick latch assemblies. The apparatus may further include a handle, lifting points, or eyelets.

In still a further example implementation, a method of repairing a damaged pipe, comprises the steps of identifying a damaged region of a pipe; providing a quick action pipe clamp, which includes a first shell portion having an inner and outer surface, a second shell portion having an inner and outer surface, a gasket in contact with the inner surface of the first and second shell portions, a hinge connecting the first shell portion and the second shell portion, two or more adjustable latch assemblies on the outer surface of the first and second shell portions, the adjustable latch assemblies including a quick latch mechanism; fitting the first and second shell portions over a damaged region of a pipe such that the gasket is between the pipe and the inner surface of the first and second shell portions; and engaging the adjustable latch assemblies to close the first and second shell portions around the pipe. The adjustable latch assemblies may be further tightened by an adjustment nut after engagement.

In another example implementation, the method of repairing a damaged pipe may further include the step of engaging multiple adjustable latch assemblies including engaging a first latch assembly by connecting a crossbar attached to a threaded pull to a catch, wherein the catch is secured to the outer portion of the second shell portion and the threaded pull is in communication with a latch arm connected to the outer surface of the first shell portion; engaging a second latch assembly by connecting a crossbar attached to a threaded pull to a catch, wherein the catch is secured to the outer portion of the second shell portion and the threaded pull is in communication with a latch arm connected to the outer surface of the first shell portion; and tightening the first and second latch assemblies by moving the latch arms of both assemblies. The tightness of the latch assembly in the closed position may be adjusted by rotating adjustment screws on the threaded pulls of the first and second latch assemblies.

Various embodiments and implementations may include one or more of the following potential advantages. The pipe repair apparatus is easily fitted over a damaged region of the pipe because of the hinged connection between the first and second shell portions. The first and second shell portions are easily and quickly secured together, forming a tight fitting around a damaged portion of the pipe due to the use of the multiple quick action, adjustable latches. The quick action latches allow for rapid but in exact fitting over a pipe. The adjustable nuts incorporated into the quick action levers allow for fine adjustments to ensure an optimal fitting. The pipe repair apparatus does not require additional tools or component assembly to install the fitting, which may be difficult in a ship board emergency.

The details of one or more embodiments are set forth in the accompanying drawings and the description below. Other features, objects, and advantages will be apparent from the description and drawings, and from the claims.

DETAILED DESCRIPTION

Figure 1:
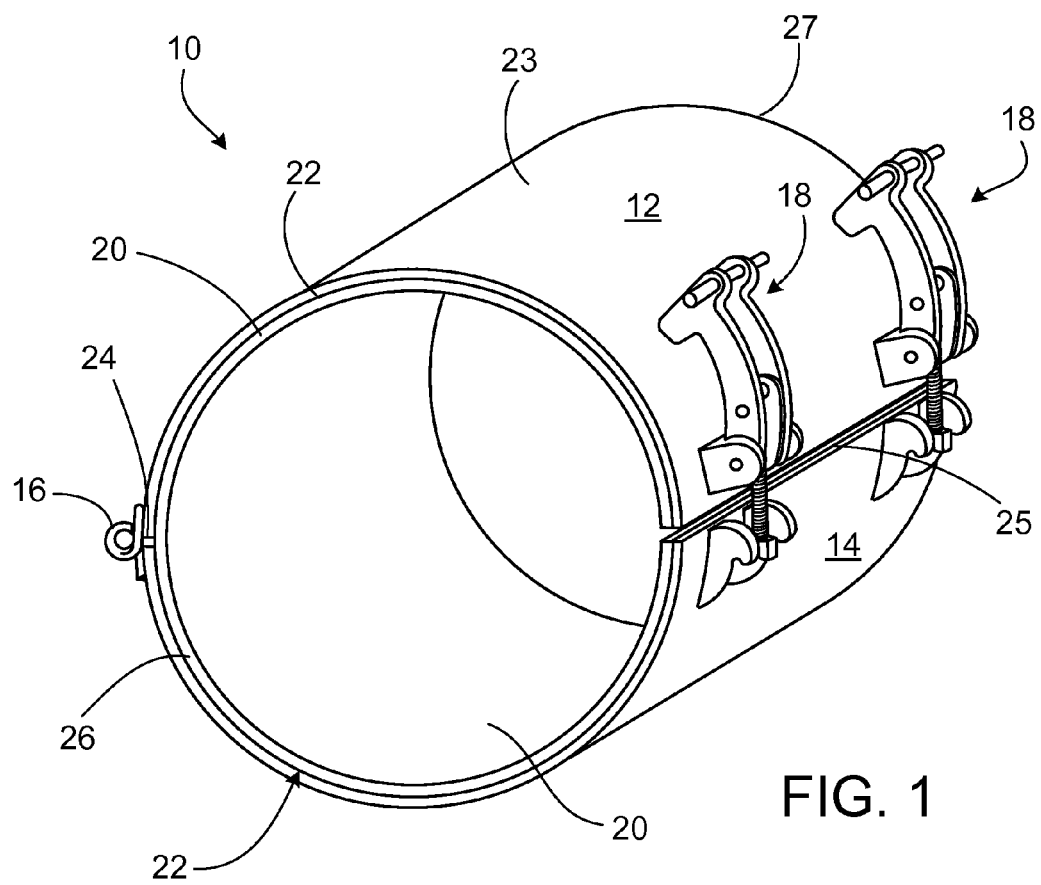
FIG. 1 is a perspective view of an implementation of a pipe patch.

Implementations and embodiments of various aspects of a pipe repair apparatus, such as a jubilee pipe patch, are described in this specification. In one example implementation, a pipe repair apparatus comprises two cylindrical shell portions, each forming a half cylinder. The two shell portions are joined together along a first longitudinal edge by a hinge. The shell portions are joined together at a second longitudinal edge by two or more quick connection latches. The quick connection latches are adjustable in the open and closed positions. A gasket is provided on the inner surface of the first and second shell portions to provide a seal between the inner surface of the first and second shell portions and the outer surface of a pipe about which the pipe repair apparatus is installed.

With reference to FIGS. 1-5, an example pipe repair apparatus (10) includes a first shell portion 12, a second shell portion 14, a hinge 16, and two or more adjustable quick action latches 18 and gasket 20.

The first and second shell portions may comprise stainless steel, chromium-nickel steel alloys, brass, composite carbon reinforced pipe, plastic, or PVC. The first and second shell portions may have a wall thickness of between 1/16 inch and 2 inches, with some embodiments having a wall thickness of 1/8 inch.

The first shell portion 12 and second shell portion 14 are half cylinders of approximately the same dimensions and include an inner surface 22 and an outer surface 23, a first longitudinal edge 24 and a second longitudinal edge 25, a first arcuate edge 26 and a second arcuate edge 27. When joined together such that the first and second longitudinal edges of the first and second shell portions are aligned, the first and second shell portions form a substantially complete cylinder, suitable for fitting over a pipe or other cylindrical body. The substantially complete cylinder of the joined shell portions may have an internal diameter of 2.37 inches, 4.5 inches, 6.625 inches, or 8.485 inches. Other internal diameters are contemplated.

Figure 4:
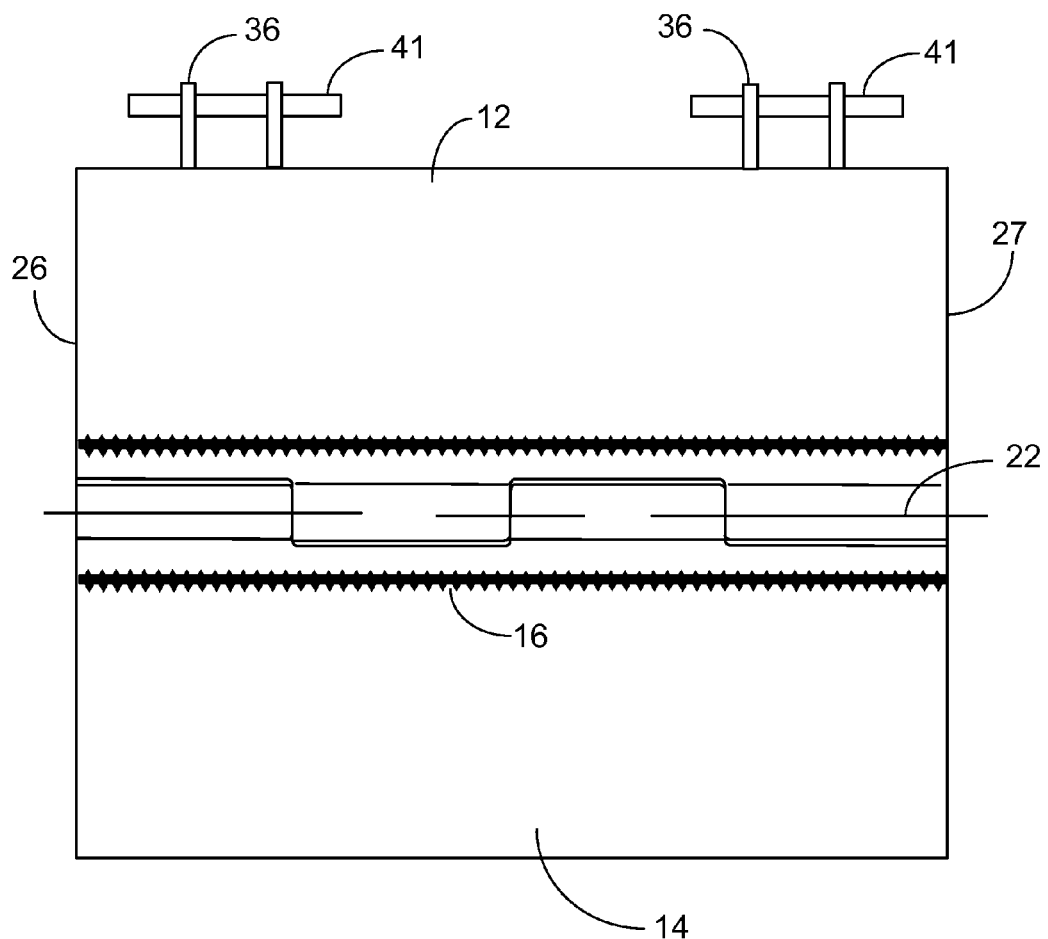
FIG. 4 is a back view of an implementation of a pipe patch.
Figure 5:
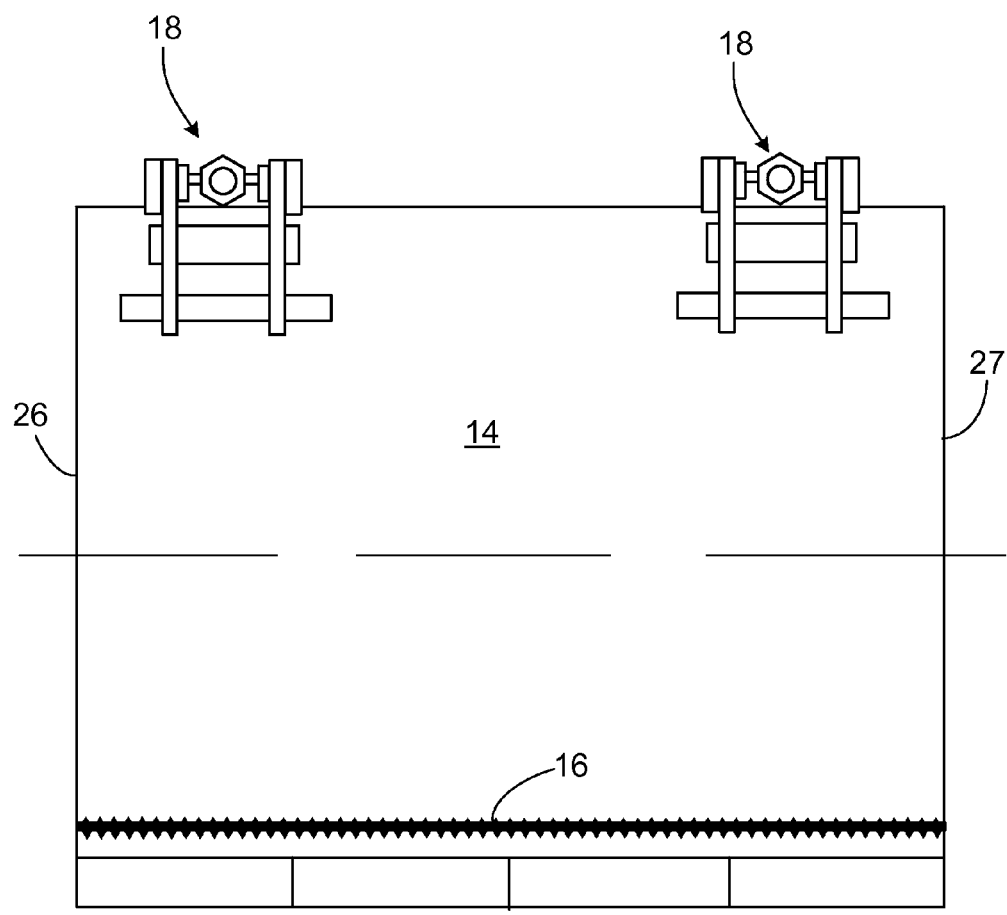
FIG. 5 is a top view of an implementation of a pipe patch.
Figure 6:
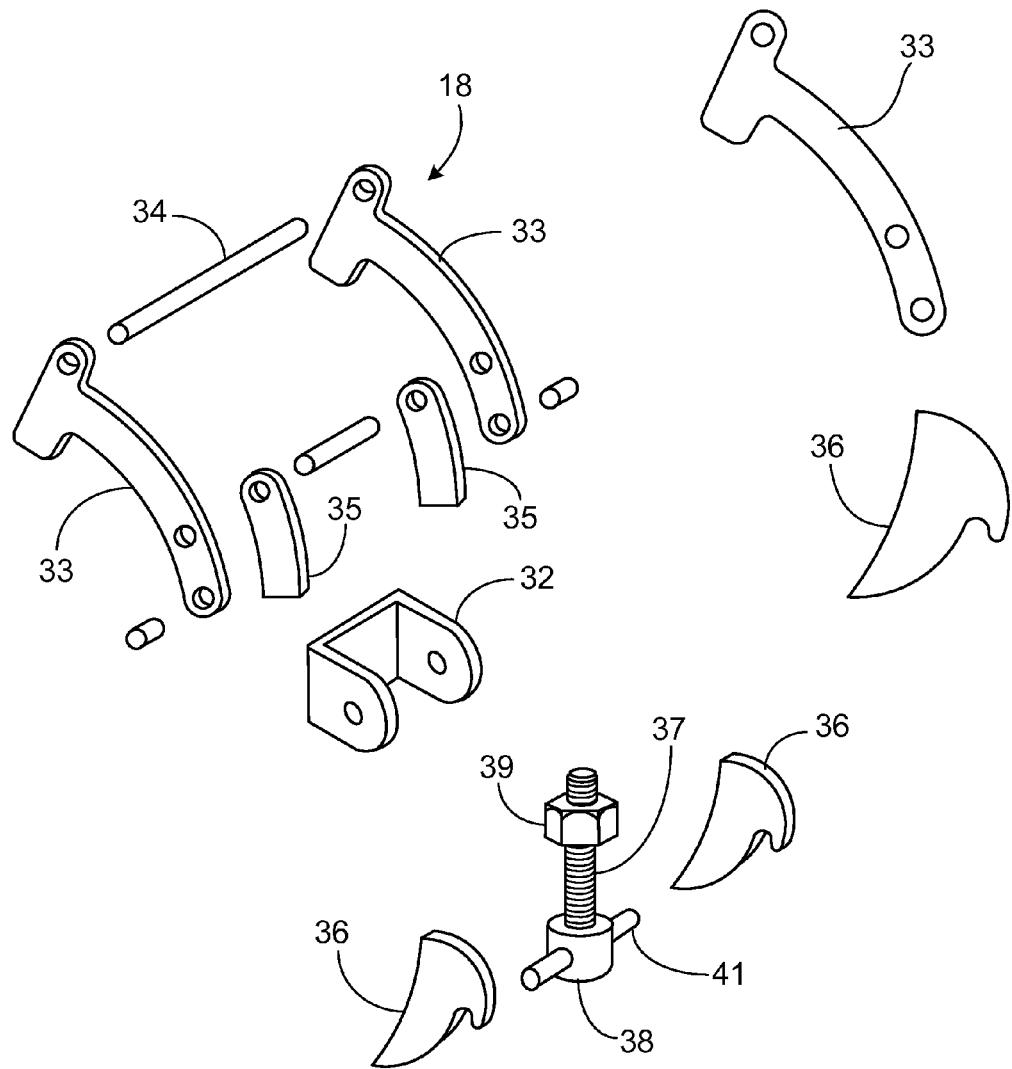
FIG. 6 is a blow-up view of components of a pipe patch.
Like reference symbols in the various drawings indicate like elements.

The first shell portion 12 is joined to the second shell portion 14 along the first longitudinal edge 24 by hinge 16, which in some implementations may be a continuous or piano hinge as illustrated in FIG. 4. Hinge 16 allows the pipe repair apparatus 10 to open, in a clam shell fashion to fit over a pipe. Pipe repair apparatus 10 opens by forcing the second longitudinal edges 25 of the first shell portion 12 and the second shell portion 14 apart, wherein the first shell portion 14 and the second shell portion 14 pivot along the first longitudinal edge 24 because of the connection to hinge 16.

In some implementations, two or more hinges may be used along the first longitudinal edges of the first and second shell portions to join the shells. Hinge 16 can be a continuous piano type hinge, a butt hinge, a flush hinge, a tee hinge, a strap hinge, or other hinge type.

Adjustable quick-action fastener or latch 18 is affixed to the outer surface 23 of the first and second shell portions (12, 14). In an example implementation, portions of the latch 18 are secured to the first shell portion 12 and other portions are secured to the second shell portion 14 to allow the first and second shell portions to be joined along the second longitudinal edges 25 of the first shell portion 12 and second shell portion 14.

Figure 2:
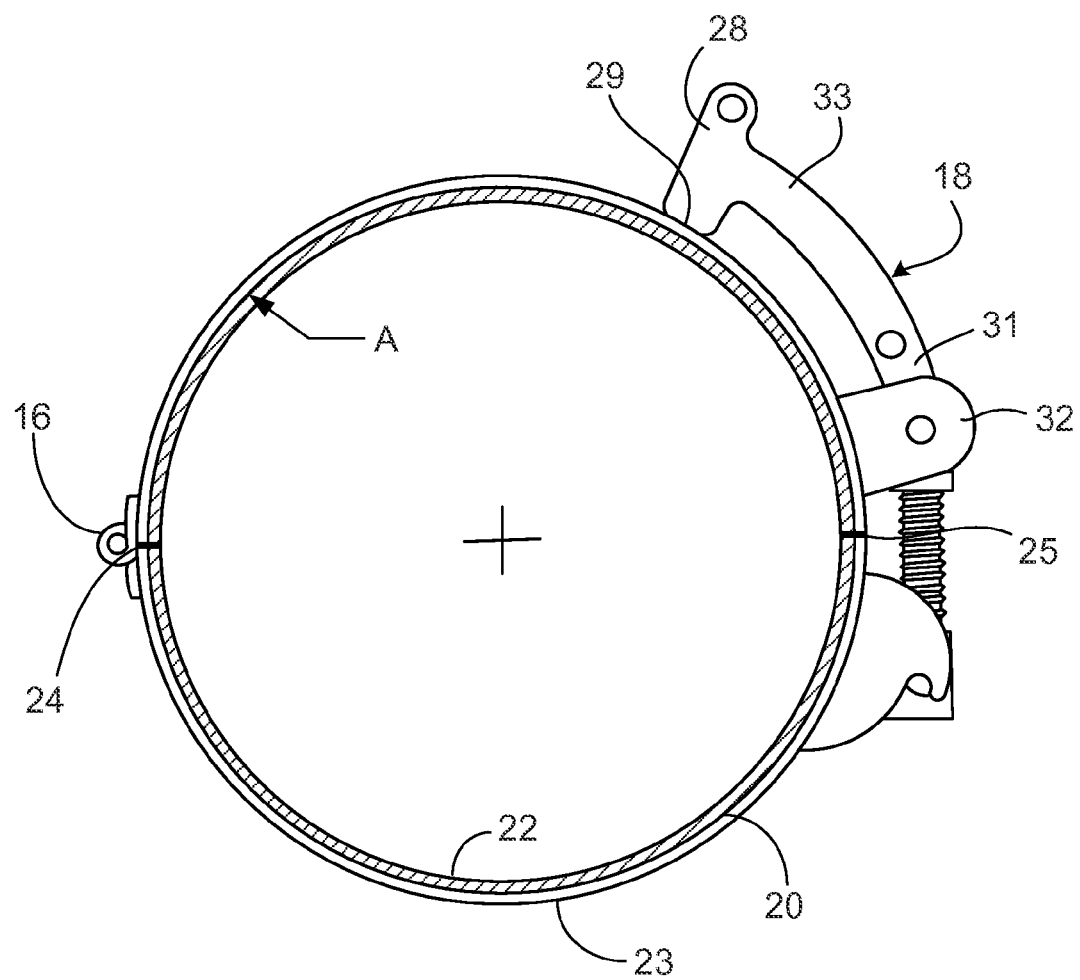
FIG. 2 is a side view of an implementation of a pipe patch.
Figure 3:
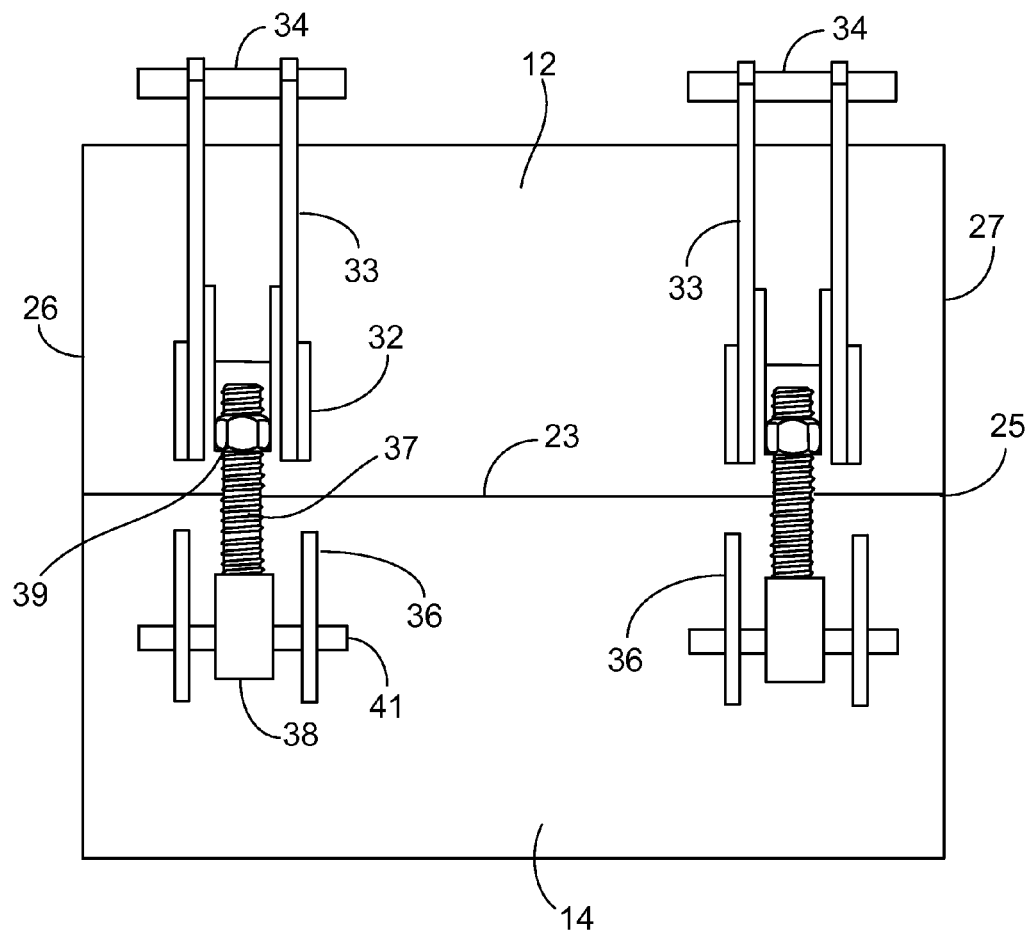
FIG. 3 is a front view of an implementation of a pipe patch.

Referring to FIGS. 1-3 and 6, adjustable quick-acting latch 18 includes, fulcrum 32, latch arm 33 pivotally connected to fulcrum 32. As shown in FIG. 2, the latch assembly 18 includes a latch arm 33 having a proximal end 31, which is pivotally connected to fulcrum 32, and a distal end forming a hammer portion 28, which in turn has a contact surface 29. The hammer portion 28 of the latch arm 33 is configured such that, when the latch arm 33 is fully rotated toward the outer surface 23 of the shell, the contact surface 29 of the hammer portion 28 contacts the outer surface 23 to establish a closed position of the latch assembly 18. In some embodiments, two latch arms 33 may be provided, in may further include cross bar 34 between the latch arms 33. Latch 18 also includes lock 35 connected to fulcrum 32 and latch arm 33. Threaded pull rod 37 with adjustable nut 39 work cooperatively with latch arm 33 and lock 35 to connect with catch 36 using pull head assembly 38.

In one example embodiment, fulcrum 32, along with latch arm 33, lock 35 and threaded pull 37 are connected to the outer surface 23 of the first shell portion 12 proximal to the second longitudinal edge 25 of the first shell portion 12. Catch 36, or multiple catches 36 are connected to the outer surface 23 of the second shell portion 14 proximal to the second longitudinal edge 25 of the second shell portion 14. In such an arrangement, the quick latch assembly 18 can traverse the second longitudinal edges 25 of the first and second shell portions 12, 14 by the threaded pull rod 37. The shell portions are secured together in a closed position when the threaded pull rod 37 extends from the fulcrum 32 toward the catch or catches 36 when the latch arms are rotated axially toward the second longitudinal edge 25 of the first shell portion 12.

In this position the pull head assembly 38 extends past catch 36 so that when the latch arm 33 is rotated in the opposite direction, that is axially away from the second longitudinal edge 25 of the first shell portion 12, the pull head assembly engages the catch or catches 36 by pull head cross bar 41. As the latch arm 33 continues to rotate away from the longitudinal edge 25, the latch assembly draws the second longitudinal edges 25 of the two shell portions 12 and 14 together, thereby securing the two shell portions into a substantially complete cylinder.

Once the pull head assembly 38 has engaged the catches 36 and the latch arms 33 have rotated to their fullest extent away from second longitudinal edge 25, the latch assembly 18 can be further adjusted, tightening or loosening the cylinder, by adjusting the position of adjustment nut 39 about the threaded pull rod 37. In this fashion, a quick, and easy enclosure about a damaged pipe can be made, and then the fitting 18 can be tightened to further prevent leaking from the damaged pipe.

The pipe repair apparatus 10 may include two or more quick acting fittings 18. In one embodiment a first quick acting fitting is positioned proximal to the first arcuate edge 26 of the first and second shell portions 12, 14. As second quick acting fitting 18 is positioned proximal the second arcuate edge 27 of the first and second shell portions 12, 14. The quick acting fitting 18 may be positions medially between the first or second arcuate edges 26, 27 and the lateral midpoint of the repair apparatus 10.

In an example embodiment a gasket 20 is included with the pipe repair apparatus 10. Gasket 20 is in contact with the inner surface 22 of the first shell portion 12 and the second shell portion 14. The gasket 20 can be a continuous, substantially planar, pliable material that extends from the longitudinal width of the pipe repair apparatus 10. The gasket 20 can extend from the second longitudinal edge 25 of the first shell portion 12 continuously around the inner surface 22, traversing the first longitudinal edge 24 of the first shell portion 12 and the second shell portion 14 and on to the second longitudinal edge 25 of the second shell portion 14. The gasket 20 may extend from the first arcuate edge 26 of the first and second shell portions 12 and 14, to the second arcuate edges 27 of the first and second shell portions 12 and 14.

The gasket 20 has a first longitudinal edge and a second longitudinal edge. In an example embodiment the first longitudinal edge of the gasket 20 is substantially aligned with the second longitudinal edge 25 of the second shell portion 12. The opposite longitudinal edge of the gasket 20 is substantially aligned with the second longitudinal edge 25 of the second shell portion 14.

In other embodiments the gasket may not be in contact with the entire inner surface of the combined first and second shell portions. Gasket 20 may only cover substantially all of the inner surface 22 of the first shell portion 12. Gasket 20 may only cover substantially all of the inner surface 22 of the second shell portion 14. Gasket 20 may be sized to terminate before the first or second arcuate surfaces 26, 27 or the first or second longitudinal edges 24, 25 of the first or second shell portions 12, 14. In such an arrangement, terminating the gasket 20 before any of the peripheral edges of the shell portions may facilitate fastening procedures, such as welding.

Gasket 20 can be adhered or bonded to the inner surface 22 of the first and/or second shell portions 12, 14. Gasket 20 may comprise rubber, silicon, rubber silicon, latex, microfiber material, or metal foil.

In operation, the pipe repair apparatus 10 is ideally suited for damage control purposes in the marine environment or in other industrial settings requiring quick or temporary repair of operating equipment.

In an example method of use, a damaged portion of pipe, such as a ruptured or cracked pipe, is evaluated to determine the pipe diameter. A pipe repair apparatus 10 of suitable size is identified. The quick acting latch 18 of the apparatus 10 is released and the second longitudinal edges 25 of the first and second shell portions 12, 14 are spread apart to open the apparatus in a clam shell fashion. The opening between the second longitudinal edges 25 of the first and second shell portions 12, 14 should be wide enough to allow the apparatus 10 to fit over the damage pipe. The apparatus is positioned over the rupture or damaged portion of pipe. The first and second longitudinal edges 24, 25 of the first and second shell portions can be positioned away from the specific rupture site to ensure that the gasket 20 and the inner surface 22 of the first or second shell portions 12, 14 rests smoothly about the damaged portions of the pipe.

The quick closure latch 18 is secured and closed, drawing the two shell portions together. The quick closure latch 18 is further adjusted using the adjustment nut 39 to tight the apparatus 10 about the pipe.

Other embodiments incorporating additional features may be provided to the pipe repair apparatus described here. For example, one or more recessed circumferential ring may be included in the inner surface 22 of the first and second shell portions 12, 14. An O-ring gasket may be incorporated into the recessed ring to provide additional sealing ability. The O-ring gasket may be in addition to the substantially planar gasket 20 described above.

In further embodiments, a handle, lifting rings, and other extensions may be included or attached to the outer surface 23 of the first and second shell portions 12, 14.

A number of embodiments have been described. Nevertheless, it will be understood that various modifications may be made without departing from the spirit and scope of the claims. For example, the quick acting fitting 18 may include a non-threaded pull rod and exclude and adjustment nut. One or more detachable quick acting fittings may be used in lieu of thee hinge along the first longitudinal edge. Grease or other sealant may be used in lieu of the gasket material. One or more gaskets may be used. A first gasket may adhered to the inner surface of the apparatus while one or more second gaskets may be used in conjunction with the device to ensure a more optimized fit about a pipe. Accordingly, other embodiments are within the scope of the following claims.

What is claimed is:

1. A pipe repair apparatus, comprising:
   a first shell portion having an inner and outer surface;
   a second shell portion having an inner and outer surface;
   a hinge connecting the first shell portion and the second shell portion;

one or more adjustable latch assemblies on the outer surface of the first and second shell portions;
wherein each adjustable latch assembly further comprises:
a fulcrum attached to the outer surface of the first shell portion;
a latch arm having a proximal end and a distal end, the proximal end being pivotally connected to the fulcrum, and the distal end having a hammer portion including a contact surface;
a pull connected to the latch arm and comprising a cross rod; and
a catch attached to the outer surface of the second shell portion and arranged to engage the cross rod of the pull;
wherein the hammer portion of the latch arm is configured such that, when the catch is engaged with the cross rod of the pull and the latch arm is fully rotated toward the outer surface of the first shell portion, the contact surface of the hammer portion contacts the outer surface of the first shell portion to establish a closed position of the adjustable latch assembly.

2. The apparatus of claim 1, further comprising:
a circumferential gasket in contact with the inner surface of the first shell portion and the second shell portion.

3. The apparatus of claim 2 wherein the gasket is adhered to the inner surface of the first and second shell portions.

4. The apparatus of claim 1, wherein the first shell portion further comprises a cylinder half having a first longitudinal edge and a second longitudinal edge opposite the first longitudinal edge; and
wherein the second shell portion further comprises a cylinder half having a first longitudinal edge and a second longitudinal edge opposite the first longitudinal edge,
wherein the hinge connects the first longitudinal edges of the first and second shell portions; and
wherein the two or more adjustable latch assemblies transverse the second longitudinal edges of the first and second shell portions.

5. The apparatus of claim 4 wherein the gasket includes a first longitudinal edge and a second longitudinal edge, the gasket adhered to the first and second shell portions such that the first longitudinal edge of the gasket is aligned with and proximal to the second longitudinal edge of the first shell portion and the second longitudinal edge of the gasket is aligned with and proximal to the second longitudinal edge of the second shell portion.

6. The apparatus of claim 1 wherein the pull connected to the latch arm is threaded and further comprises an adjustment nut threaded onto the pull.

7. The apparatus of claim 1 wherein the adjustable latch assembly further comprises two latch arms and a cross bar connecting the two latch arms.

8. The apparatus of claim 1 wherein the first and second shell portions comprise stainless steel, chromium-nickel steel alloys, brass, composite carbon reinforced pipe, plastic, or PVC.

9. The apparatus of claim 2 wherein the gasket comprises, rubber, silicon, rubber silicon, latex, microfiber material, or metal foil.

10. The apparatus of claim 1 wherein the first and second shell portions when joined have an internal diameter of between 2 inches and 9 inches.

11. A method of repairing a damaged pipe, comprising:
(a) providing a quick action pipe clamp comprising:
(i) a first shell portion having an inner and outer surface;
(ii) a second shell portion having an inner and outer surface;
(iii) a gasket in contact with the inner surface of the first and second shell portions;
(iv) a hinge connecting the first shell portion and the second shell portion;
(v) one or more adjustable latch assemblies on the outer surface of the first and second shell portions, each adjustable latch assembly including a fulcrum attached to the outer surface of the first shell portion; a latch arm having a proximal end and a distal end, the proximal end being pivotally connected to the fulcrum, and the distal end having a hammer portion including a contact surface; a pull connected to the latch arm and comprising a cross rod; and a catch attached to the outer surface of the second shell portion and arranged to engage the cross rod of the pull;
(b) fitting the first and second shell portions over a damaged region of a pipe such that the gasket is between the pipe and the inner surface of the first and second shell portions;
(c) engaging the adjustable latch assemblies to close the first and second shell portions around the pipe; and
(d) rotating the distal end of the latch arm toward the outer surface of the first shell portion until the contact surface of the hammer portion of the latch arm comes into contact with the outer surface of the first shell portion, thereby establishing a closed position of the latch assembly.

12. The method of claim 11 wherein the adjustable latch assemblies are further tightened by an adjustment nut after engagement.

13. The method of claim 11 wherein the gasket is in contact with substantially the entire inner surface of the first and second shell portions.

14. The method of claim 11 wherein engaging the latch assemblies further comprises:
engaging a first latch assembly by connecting a crossbar attached to a threaded pull to a catch, wherein the catch is secured to the outer portion of the second shell portion and the threaded pull is in communication with a latch arm connected to the outer surface of the first shell portion;
engaging a second latch assembly by connecting a crossbar attached to a threaded pull to a catch, wherein the catch is secured to the outer portion of the second shell portion and the threaded pull is in communication with a latch arm connected to the outer surface of the first shell portion; and
tightening the first and second latch assemblies by moving the latch arms of both assemblies.

15. The method of claim 11 further comprising:
adjusting the tightness of the latch assembly by rotating adjustment screws on the threaded pulls of the first and second latch assemblies.

* * * * *